United States Patent [19]

Lesser et al.

[11] Patent Number: 5,401,905
[45] Date of Patent: Mar. 28, 1995

[54] CABLE DUCT FOR HOLDING CABLE HARNESSES

[75] Inventors: Hans-Jurgen Lesser, Rheinfelden; Antoine Raymond, Lorrach, both of Germany

[73] Assignee: A. Raymond KG, Lorrach, Germany

[21] Appl. No.: 16,993

[22] Filed: Feb. 12, 1993

[30] Foreign Application Priority Data

Feb. 13, 1992 [DE] Germany .................. 42 04 187.2

[51] Int. Cl.⁶ .............................................. H02G 3/00
[52] U.S. Cl. ................................... 174/99 R; 174/97; 174/101; 174/68.3; 138/108
[58] Field of Search ............... 174/99 R, 71 R, 72 R, 174/72 A, 89, 91, 92, 95, 97, 99 E, 101, 68.1–68.3; D8/356, 153; 138/108, 106, 162, DIG. 11

[56] References Cited

U.S. PATENT DOCUMENTS 4,864,082  9/1989  Ono et al. ....................... 174/97

FOREIGN PATENT DOCUMENTS 3935628  9/1991  Germany .
0881847  11/1961  United Kingdom .......... 174/101

*Primary Examiner*—Leo P. Picard
*Assistant Examiner*—Hyung S. Sough
*Attorney, Agent, or Firm*—Finnegan, Henderson, Farabow, Garrett & Dunner

[57] ABSTRACT

A cable for holding a bundle of cable lines of different sizes having a channeled body (1) which can be anchored to a support, the body having a baseplate (2), two side walls (3 and 4) and a plurality of covering brackets (6) integrally hinged to the upper edge of one of the walls (3). The brackets have at their free ends latching lugs (10) which, when the brackets are closed, interact with corresponding locking tabs (8) on the wall (4). To be able to bundle together the cable lines in the cable duct and thus provide protection against rattling noises, toothed cable ties (12), which extend around the inner sides of the channel body, are provided in the regions of the covering brackets (6), the cable ties being connected at one end to the body in the region of the wall (4) and, when the brackets (6) are closed, interacting at their free end with a cable tie locking tooth (15).

3 Claims, 2 Drawing Sheets

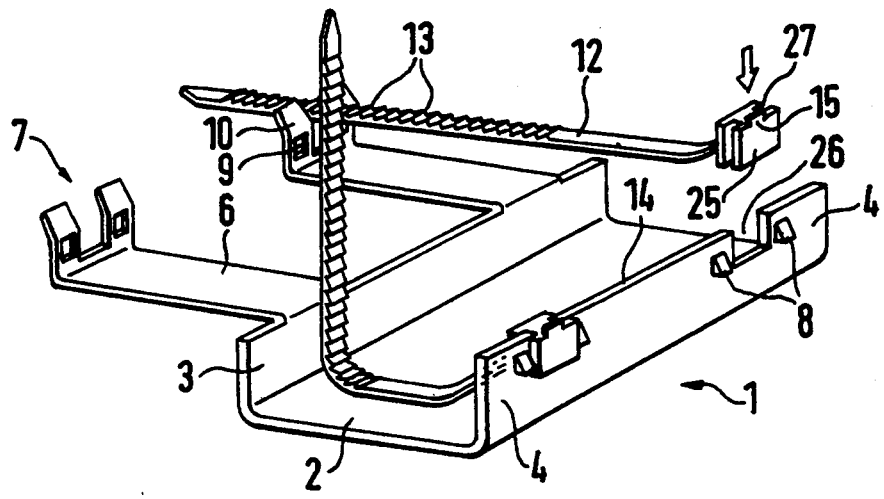
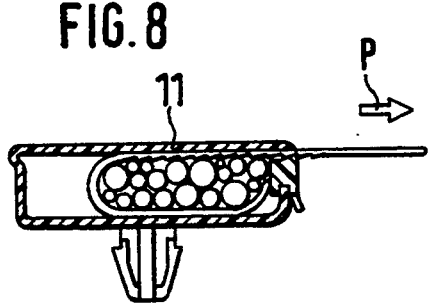
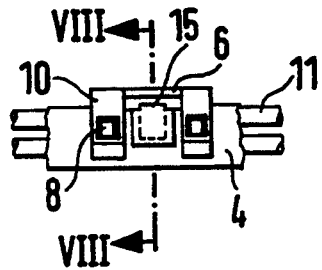
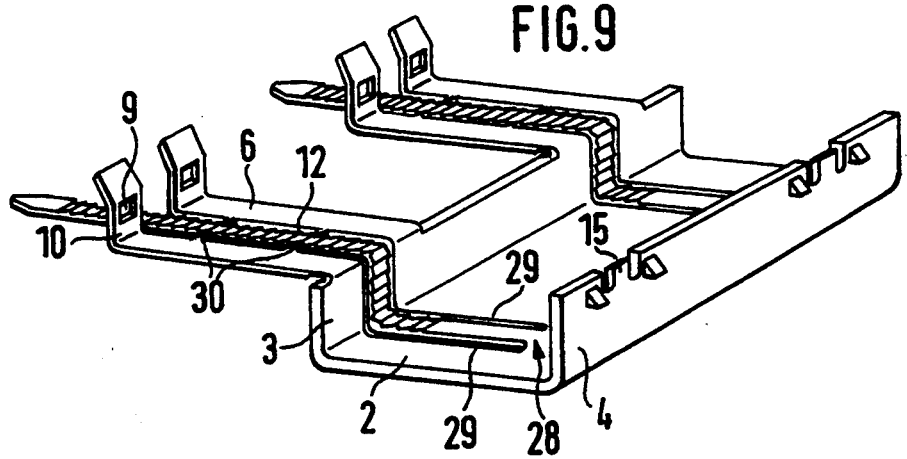

CABLE DUCT FOR HOLDING CABLE HARNESSES

BACKGROUND OF THE INVENTION

This invention relates to a cable duct for use in motor vehicles for holding cable harnesses consisting of a bundle of cable lines. The cable duct comprises, in a known manner, a baseplate having two walls forming a channel for the harness and a plurality of spaced covering brackets that are integrally hinged to the upper edge of one wall such that they can pivot down to cover the duct and hold the harness in the channel and whose free ends are provided with locking means which, when the brackets are closed, engage with corresponding locking means on an opposite wall of the channel.

This cable duct is typically inserted into depressions provided for this purpose in the bodywork or floor panels of an automobile and is attached there in a known manner. The bundle of the cable lines laid in the duct has different sizes over the length of the cable duct depending on how many of the cable lines already been led away to various locations.

The cable duct has a flattened or elongated cross section and is designed with enough spare space for the maximum number of cable lines to be held. Consequently, the inserted cable lines lie more or less loosely in the duct and can cause rattling noises when driving, because of the vibrations which occur.

A cable duct of this type is already known from German Patent No. 39 35 628 A1. Here cable ties are provided to avoid such rattling noises, which cable ties can be pulled around the lines and connected to the channel-shaped base of the duct in the region of a wall thereof. Although the cable lines can be formed into a tight harness by the ties, a plurality of cable ties must first be inserted into free spaces provided along the length of the cable duct for this purpose, and then the ties must be threaded into appropriate looks, all of which is time consuming.

SUMMARY OF THE INVENTION

In order to solve the noise problem of the rattling cable lines in a simpler manner and make assembly much easier, it is proposed, according to the present invention, to arrange the cable ties which enclose the channel space and bundle the lines together into a harness in each case in the region of the brackets, such that when the brackets are closed, the cable ties will automatically interact at their free ends with a cable tie locking means. Consequently, once the cable lines have been inserted into the duct and the brackets closed, the lines can be pulled tight to form a rigid harness, simply by pulling on projecting ends of the cable ties, and the lines can thus be protected against rattling noises caused by vibration.

According to a preferred embodiment of the invention, the interaction of the cable ties with a cable tie lock means can be provided by providing the cable tie with sawtooth-shaped latching teeth on a free end thereof, which, when the bracket is closed, interact with a cooperating latching device or tooth arranged on an upper edge of a wall of the duct. Then these cable ties with their teeth in the closing direction can simply be pulled through and locked in place. In this case, the latching teeth of the cable ties can be directed both towards or away from the cable harness, as well as parallel to the cable harness. The important feature is that the associated latching device be provided with appropriately arranged and aligned latching fingers or teeth.

A particularly simple and at the same time effective harnessing of the cable lines can be achieved if each bracket is provided with two spaced latching lugs on its free end which engage over a wall of the channel-shaped duct when the brackets are closed and that are bent towards the base thereof with the cable tie ends passing between these two latching lugs. Further that one latching tooth is integrally formed on the wall engaged by the brackets to fit between the latching tabs, so that the latching tooth will interact with the latching teeth on the ties when the brackets are closed.

BRIEF DESCRIPTION OF THE DRAWINGS

The drawings show a number of embodiments of the invention and are explained in further detail below. Of the drawings:

FIG. 6 shows an alternative embodiment of the same cable duct section having integrated cable ties, but having a different construction for attaching the cable ties to the duct;

FIG. 7 is a partial front view of the cable duct of FIG. 6, closed and filled with cable lines, with a view of the cable tie lock;

FIG. 8 is a sectional view of the same cable duct, having the cable tie tightened, taken along the line VIII—VIII in FIG. 7; and FIG. 9 shows yet a further embodiment of the cable duct, having integrally formed-in cable ties.

DETAILED DESCRIPTION OF THE INVENTION

Figure 1:
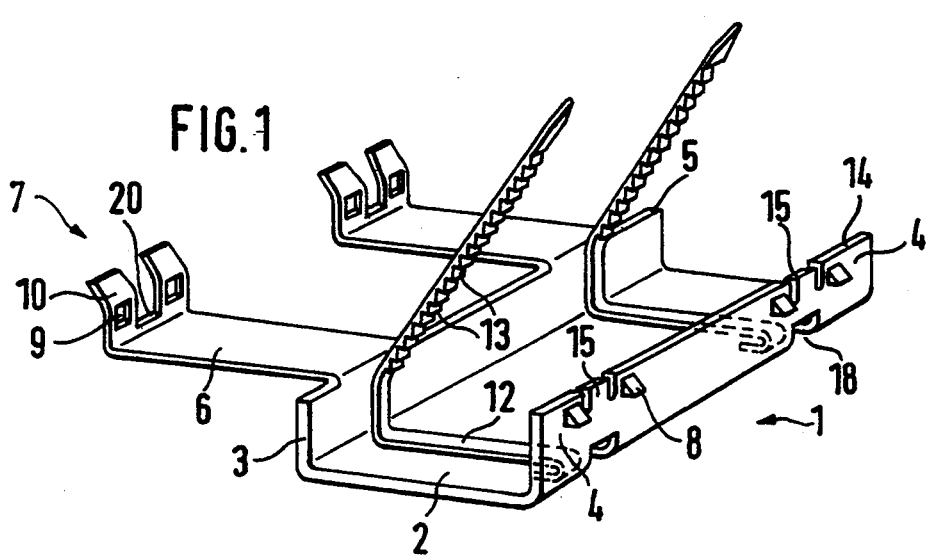
FIG. 1 is a perspective view of a section of the cable duct according to the invention, having integrated cable ties.

The cable duct shown in the drawings comprises a channel-shaped duct body 1, which is normally made from a plastic material and has a baseplate 2 and two side walls 3 and 4. It also has a plurality of spaced covering brackets 6, which are integrally hinged to the upper edge 5 of one wall 3, such that they can pivot down towards the other wall 4. The covering brackets 6 are provided on their free ends with a latching means 7 which interacts with a cooperating locking means on the outside of wall 4.

In the present embodiment, latching means 7 comprise rectangular recesses 9 in two spaced lugs 10, which are integrally formed at approximately right angles on the free ends of the covering brackets 6 and, once the covering brackets 6 have been closed, extend over the opposite channel wall 4. At the same time, lugs 10 slide over locking tabs 8, that are integrally formed on the outside of wall 4, until the tabs 8 lock into the recesses 9.

To secure or harness the cable lines 11 laid in the cable duct with respect to one another and with respect to the duct, elongated, flexible cable ties 12 are provided in the region of the brackets 6. These cable ties 12 are connected at one end in the region of channel wall 4 and extend around the interior space of the channel of the duct as shown in FIG. 1. In accordance with the invention, ties 12 have a plurality of sawtooth-shaped latching teeth 13 on the opposite or free ends thereof. To connect the cable ties 12 at one end to the baseplate 2 of the duct, the ties are bent around at that end to form a hook 16 which extends around the edge 17 of a recess 18 in the base 2 and latches into a notch 19 therein (See FIG. 2).

Figure 2:
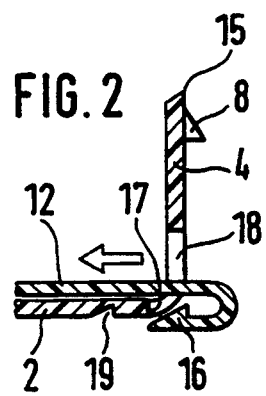
FIG. 2 is an enlarged partial view showing the attachment of one end of a cable tie in the base of the duct.

In the area between latching tabs 8, a latching tooth 15 is provided on the upper edge 14 of wall 4, the top surface of which inclines inwardly (See FIG. 2). Cable ties 12 are placed in duct 1 so that they interact with these latching teeth 15 when the brackets 6 are closed, the ties 12 entering into the intermediate space between the two latching lugs 10 and then being pressed down against the teeth 15 by the upper edge 20 of this space.

Figure 3:
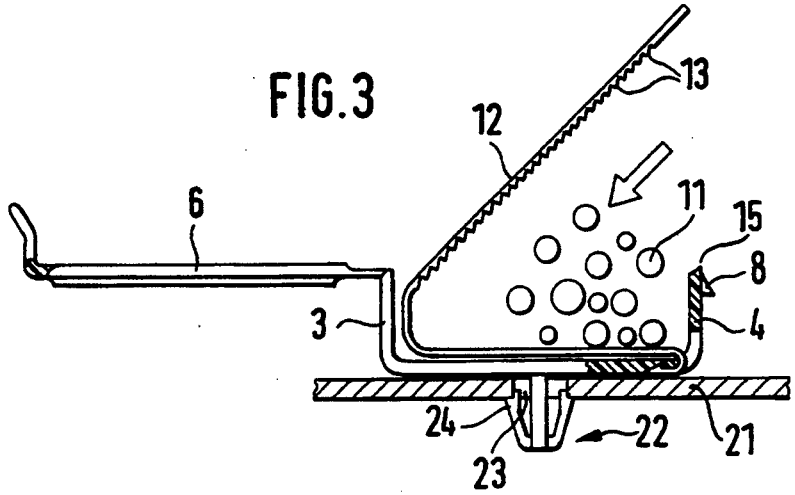
FIG. 3 shows the cable duct in section secured to a panel with the cable lines being inserted.
Figure 4:
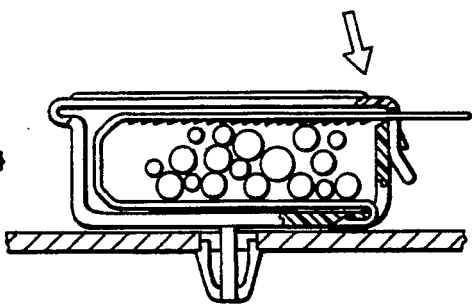
FIG. 4 shows the same assembly after closing of the covering brackets and with the cables still loose in the duct.
Figure 5:
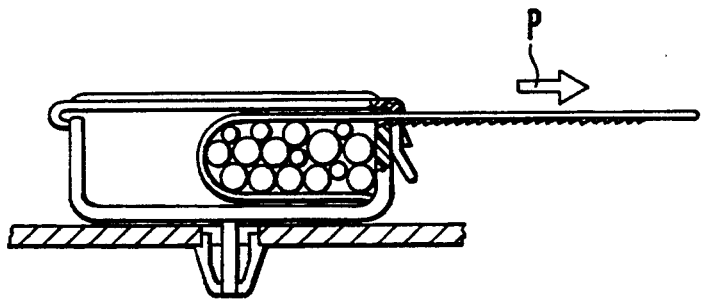
FIG. 5 shows the same assembly after tightening of the cable ties and harnessing of the cable lines.

The procedure according to the invention for harnessing the cable lines 11 will be explained with reference to FIGS. 3 to 5.

The cable duct 1 is initially secured to a floor panel 21 of a motor vehicle. To this end, the baseplate 2 thereof is provided on its underneath side with a standard anchoring foot 22, which is inserted into a hole 23 in the floor panel 21 and is anchored by means of expanding legs 24 (See FIG. 3).

After insertion of the cable lines 11, brackets 6 are closed, the tabs 8 locking into the recesses 9 in the lugs 10 of the brackets to hold them closed. Because of the position of the prearranged cable ties 12, they are automatically pushed down by the brackets with their ends falling into the intermediate spaces between the lugs 10 and then being pressed by the edges 20 against corresponding latching teeth 15 on the wall 4 (See FIG. 4).

When all the brackets 6 have been closed, the cable ties 12 are then pulled outwardly in the direction of the arrow "P", the latching teeth 15 and also the edges 20 of the brackets 6 flexing elastically somewhat as the ties pass by them. The cable ties 12 are pulled out until the cable lines 11 are bundled into a tight harness as shown in FIG. 5, the teeth 13 on the ties 12 locking against the teeth 15 to hold the ties in place. This prevents the cable lines 11 from flying to and fro loosely in the duct and hence causing undesirable noises.

FIG. 6 shows the same cable duct section as FIG. 1, but having a different construction for the cable tie closure. In this case, the cable tie 12 is integrally formed with a closure body 25 that extends transversely with respect to the tie direction and can be fixed in a recess 26 in the channel wall 4, between the latching tabs 8. For this purpose, closure body 25 has two slots 27 on its two sides matched to the thickness of wall 4 so that it can be pushed into the recess 26. Latching tooth 15 is integrally formed on the top side thereof, which latching tooth 15 interacts with cable tie teeth 13 in a manner similar to the previous embodiment at the level of the upper edge 14 of wall 4 when closure body 25 is installed in duct 1.

In comparison with the first-mentioned embodiment, this embodiment offers the advantage that the means for attachment of the cable tie 12 to the duct and of the locking of the tightened cable tie are combined in the closure body 25, so that only a recess 26 need be formed into the channel wall 4 of the cable duct.

A further embodiment of the cable duct according to the invention is shown in FIG. 9. In this case, the cable ties 12, which are essentially of similar construction, are integrally connected to the baseplate 2, to the wall 3 and to the covering bracket 6, but are separated from these parts of the cable duct on both sides thereof by slots 29. They are connected to these parts only by narrow webs 30, which can be readily broken. The covering bracket 6 is otherwise of identical construction to that in the cable ducts already described and is also closed and latched in the same way after insertion of the cable lines 11.

In order to form the lines 11 into a harness, it is then just necessary to pull the end of the cable tie 12 strongly, so that the connecting webs 30 break and the tie 12 slides out between the bracket 6 and a latching tooth 15 until the cable lines 11 are bundled tightly against one another.

This embodiment saves the step of separately inserting the cable ties and will thus be cheaper in use than the aforementioned versions, but with identical operation and identical ease of use.

It is evident that the integration of a cable tie in a cable duct can also be applied in the case of cable clamps wherever the requirement exists for cable harnesses to be supported without vibration and the spring arms, which are normally integrally formed for this purpose on an inner wall of the clamp, do not adequately satisfy this requirement.

What is claimed is:

1. A cable duct for holding a harness of a bundle of cable lines, comprising a baseplate, two walls forming a channel with said baseplate for receipt of the cable bundle, a plurality of spaced covering brackets integrally hinged at one end to an upper edge of one of the walls and having two spaced lugs on the free ends thereof which, when the brackets are closed over the channel, extend over an upper edge of the other of said walls, said lugs having recesses therein that interact with locking tabs on said other wall, means for anchoring the duct to a support, and elongated, flexible cable ties connected at one end to the duct in the region of said other wall and extending around the interior of said channel adjacent the covering brackets to a free end thereof, each of said cable tie having sawtooth-shaped latching teeth on its free end, that, when the brackets are closed, extend between said spaced lugs of said brackets and engage and interact with a cooperating latching tooth on the upper edge of said other wall that is located between said locking tabs whereby when the brackets are closed, the brackets will press the free ends of said cable ties into engagement with said cooperating teeth so that the cable ties can be pulled tight against the bundle of cables in the duct and locked in place by said cooperating teeth.

2. The cable duct of claim 1, wherein the cable ties are integrally connected at one end to the baseplate of the duct, and are located in slots in the baseplate, in said one wall and in the covering brackets, and are connected thereto by breakable webs.

3. A cable duct for holding a harness of a bundle of cable lines, comprising a baseplate, two walls forming a channel with said baseplate for receipt of the cable bundle, a plurality of spaced covering brackets integrally hinged at one end to an upper edge of one of the walls and having locking means on the free ends thereof which, when the brackets are closed over the channel, interact with cooperating bracket locking means on the other of said walls, means for anchoring the duct to a support, elongated, flexible cable ties connected at one end to the duct in the region of said other wall and extending around the interior of said channel adjacent the covering brackets to a free end thereof, and cable tie locking means on an upper edge of said other wall adjacent said bracket locking means, whereby when the brackets are closed, the brackets will press the free ends of said cable ties into engagement with said cable tie locking means, said each of cable ties being integrally connected at said one end to the baseplate of the duct and located in slots in the base, in said one wall and in one of said covering brackets and connected thereto by breakable webs so that said ties can be pulled at least partially out of said slots and tight against the bundle of cables in the duct and locked in place by said locking means.

* * * * *